(12) United States Patent
Kim

(10) Patent No.: US 12,330,924 B2
(45) Date of Patent: Jun. 17, 2025

(54) APPARATUS AND METHOD FOR TRUCK UNLOADING BY SENSING PRESENCE OR ABSENCE OF PALLET

(71) Applicant: HYUNDAI MOBIS CO., LTD., Seoul (KR)

(72) Inventor: Young Min Kim, Osan-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 351 days.

(21) Appl. No.: 17/722,692

(22) Filed: Apr. 18, 2022

(65) Prior Publication Data

US 2022/0402733 A1 Dec. 22, 2022

(30) Foreign Application Priority Data

Jun. 16, 2021 (KR) .................. 10-2021-0078083

(51) Int. Cl.
*B66F 9/06* (2006.01)
*G01S 15/04* (2006.01)
*G05D 1/00* (2024.01)

(52) U.S. Cl.
CPC ............. *B66F 9/063* (2013.01); *G01S 15/04* (2013.01); *G05D 1/0214* (2013.01); *G05D 1/0217* (2013.01); *G05D 1/0289* (2013.01)

(58) Field of Classification Search
None
See application file for complete search history.

(56) References Cited

U.S. PATENT DOCUMENTS

| | | | |
|---|---|---|---|
| 2013/0342653 A1* | 12/2013 | McCloskey | H04N 13/204 348/46 |
| 2014/0277691 A1* | 9/2014 | Jacobus | B66F 9/24 700/216 |
| 2018/0060764 A1* | 3/2018 | Hance | G06Q 10/043 |
| 2018/0273292 A1* | 9/2018 | High | B66F 9/063 |
| 2020/0097022 A1* | 3/2020 | Miki | G05D 1/0217 |
| 2020/0174473 A1* | 6/2020 | Moriya | G05D 1/0297 |
| 2020/0387154 A1* | 12/2020 | Sellner | G05D 1/0027 |
| 2021/0294349 A1* | 9/2021 | Hasegawa | G05D 1/0291 |

FOREIGN PATENT DOCUMENTS

EP    2178035 A1 *    4/2010    ............. G01B 17/00

OTHER PUBLICATIONS

Espacenet English Translation of EP2178035A1 (Year: 2010).*

* cited by examiner

*Primary Examiner* — James J Lee
*Assistant Examiner* — Andrew Sang Kim
(74) *Attorney, Agent, or Firm* — NSIP Law

(57) ABSTRACT

An automatic truck unloading apparatus and method are provided. The automatic truck unloading apparatus generates sensing information regarding the presence or absence of a pallet on the truck by implementing sensors installed in a region of a truck and a region of a storage area, and sets optimal transport paths for multiple unmanned forklift vehicles based on the sensing information, and unloads a pallet from the truck and moves and stores the pallet in the storage area by implementing an unmanned forklift vehicle.

8 Claims, 5 Drawing Sheets

Sense presence or absence of pallet within truck

Sense pallet storage position

Pallet position data management

APPARATUS AND METHOD FOR TRUCK UNLOADING BY SENSING PRESENCE OR ABSENCE OF PALLET

CROSS-REFERENCE TO RELATED APPLICATIONS

This application is based on, and claims the benefit under 35 USC § 119(a) of Korean Patent Application Number 10-2021-0078083, filed Jun. 16, 2021, the entire disclosure of which is incorporated by reference herein for all purposes.

BACKGROUND

1. Field

The following description relates to an apparatus and method for truck unloading by sensing the presence or absence of a pallet.

2. Description of Related Art

The description in this section merely provides background information related to the present disclosure and does not necessarily constitute the related art.

Logistics automation in a smart factory aims to automate the transportation of parts or finished goods between trucks, warehouses, and production facilities. When loading or unloading cargo onto or from a truck during a logistics process, a pallet loaded with cargo may be moved using a forklift vehicle. Accordingly, when it comes to loading or unloading cargo onto or from a truck, logistics automation refers to moving a pallet using an unmanned forklift vehicle (also collectively called Automated Guided Vehicles (AGVs) together with other unmanned transport means).

Although many advances have been made in technologies using an unmanned forklift vehicle for loading cargo onto a trailer, there are few known applications where unmanned forklift vehicles are used for unloading cargo from a truck. When loading finished goods usually manufactured in production facilities onto a trailer, pallets loaded with finished goods can be controlled since the pallet type for these finished goods, the pallet's position for movement, etc. are already known. On the contrary, when unloading parts from a truck, controlling many different types of pallets loaded with the parts can be relatively difficult, because this requires determining the presence or absence of pallets at each storage position within the truck, and determining the storage space available for unloaded pallets.

To determine the presence or absence of a pallet, an unmanned forklift vehicle may use a camera vision-based method. However, a problem with this method is that a storage space may not be recognized if concealed by an obstacle. Generally, the unmanned forklift vehicle moves an unloaded pallet and then puts it down in places like shelves or racks that can be predesignated, or on preset alignment device. If an existing storage area (or storehouse) does not satisfy this condition (for example, a flat ground where there is no alignment device/sensor), the storage area needs to be converted into a space with shelves or racks which are easy to control, which involves enormous costs. Therefore, there needs to be a method that can effectively sense the presence or absence of a pallet in a truck and in a storage area.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a truck unloading apparatus includes a first sensor configured to generate first information as first sensing information regarding a presence or an absence of a first pallet in each of a plurality of first storage positions within a truck, the first sensor being disposed in a region of the first storage positions; a second sensor configured to generate second information as second sensing information regarding a presence or an absence of a second pallet in each of a plurality of second storage positions within a pallet storage area, the second sensor being disposed in a region of the second storage positions; and a controller configured to receive the first information from the first sensor and receive the second information from the second sensor and set an optimal transport path for each of at least one unmanned forklift vehicle to move the first pallet or the second pallet based on the received first information and the received second information.

The controller may be further configured to transmit a transport command including the optimal transport path to each of the at least one unmanned forklift vehicle.

The controller may be further configured to set each of the plurality of first storage positions sensed as having the first pallet based on the first information as start points, and select one of the start points as a starting position for transport of the first pallet by determining a shortest path between a current position of the one of the at least one unmanned forklift vehicles and the selected start point, and set each of the plurality of second storage positions sensed as being unoccupied based on the second information as arrival points, and select an arrival position for the transport of the first pallet by determining a shortest path between the starting position for transport of the first pallet and the arrival position.

The controller may be further configured to set the first shortest path between the current position of the one of the at least one unmanned forklift vehicle and the selected start point by: finding the shortest path for the at least one unmanned forklift vehicle, calculating a chance of collision between the at least one unmanned forklift vehicle along the first shortest path between the current position of the one of the at least one unmanned forklift vehicle and the selected start point and another unmanned forklift vehicle along a predicted transport path, and setting the first shortest path between the current position of the one of the at least one unmanned forklift vehicle and the selected start point as the optimal transport path when the chance of collision is equal to or less than a preset threshold.

When the chance of collision exceeds the preset threshold, the controller may be configured to: set a second shortest path by determining the shortest path for the at least one unmanned forklift vehicle, and calculate the chance of collision between the at least one unmanned forklift vehicle along the second shortest path between the current position of the one of the at least one unmanned forklift vehicle and the selected start point and the another unmanned forklift vehicle along the predicted transport path.

The truck may be a wing body truck, and unloading of the first pallet is performed at a side of the truck.

In a general aspect, a method includes generating first information as first sensing information regarding a presence or an absence of a first pallet in each of a plurality of first storage positions within a truck by implementing a first sensor, the first sensor being disposed in a region of the first storage positions; generating second information as second sensing information regarding a presence or an absence of a second pallet in each of a plurality of second storage positions within a pallet storage area by implementing a second sensor, the second sensor being disposed in a region of the second storage positions; receiving the first information from the first sensor and receiving the second information from the second sensor; and setting an optimal transport path for each of at least one unmanned forklift vehicle to move the first pallet or the second pallet based on the received first information and the received second information.

In a general aspect, a non-transitory computer-readable storage medium storing instructions that, when executed by a processor, cause the processor to: generate first information as first sensing information regarding a presence or an absence of a first pallet in each of a plurality of first storage positions within a truck by implementing a first sensor, the first sensor being disposed in a region of the first storage positions; generate second information as second sensing information regarding a presence or an absence of a second pallet in each of a plurality of second storage positions within a pallet storage area by implementing a second sensor, the second sensor being disposed in a region of the second storage positions; receive the first information from the first sensor and receive the second information from the second sensor; and set an optimal transport path for each of at least one unmanned forklift vehicle to move the first pallet or the second pallet based on the received first information and the received second information.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
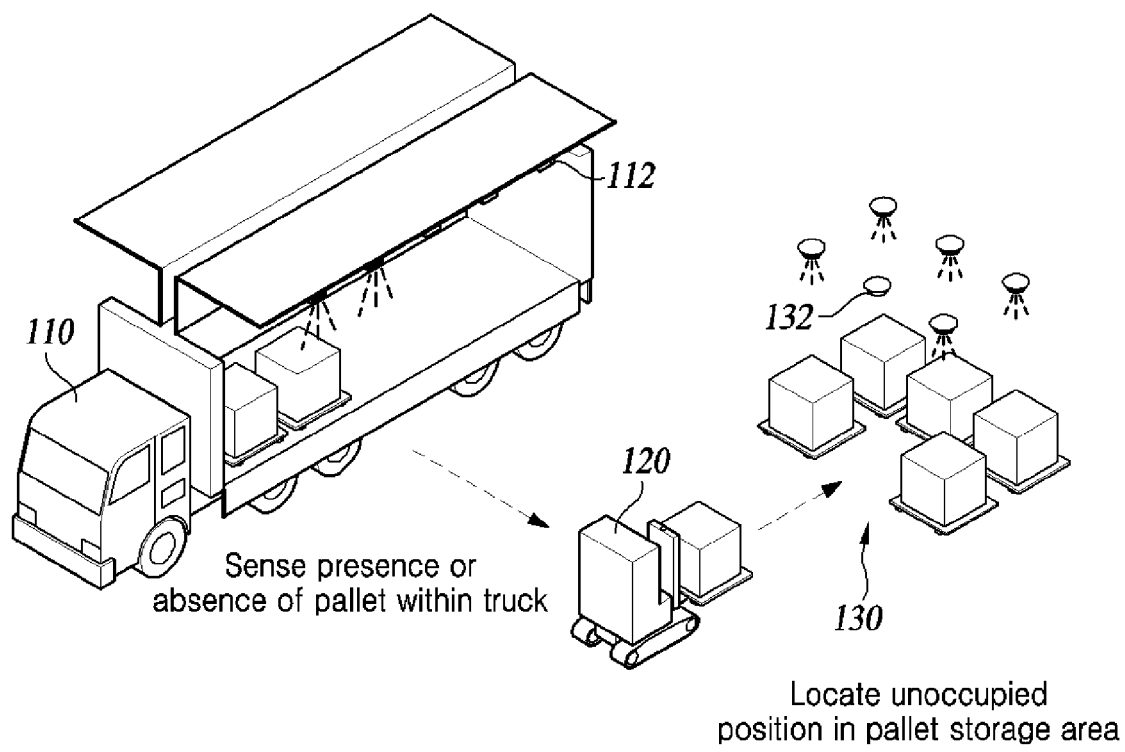
FIG. 1 illustrates a block diagram of a truck unloading apparatus, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

One or more examples relate to an automatic truck unloading apparatus and method that generates sensing information regarding the presence or absence of a pallet by using sensors installed in an upper part of a truck and an upper part of a storage area, and sets optimal transport paths for multiple unmanned forklift vehicles by using this sensing information.

An embodiment of this disclosure discloses an apparatus and method for truck unloading by sensing the presence or absence of a pallet. More particularly, an example provides an automatic truck unloading apparatus and method that generates sensing information regarding the presence or absence of a pallet by using sensors installed in an upper part of a truck and an upper part of a storage area, and set optimal transport paths for multiple unmanned forklift vehicles by using this sensing information, in order to unload a pallet from a truck and then move and store it in the storage area by using an unmanned forklift vehicle.

In the following description, a "truck" as used herein may be a wing body truck (see FIG. 1) or a similar truck, for example, but is not limited thereto. In the wing body truck, as two lids (or one lid) of a loading compartment open upward, loads (pallets and loads with the pallets under them) emerge. Unlike a trailer in which loading and unloading are performed at the rear of a truck, loading and unloading from the wing body truck are performed at the side of the truck. Meanwhile, it should be noted that, unless specified otherwise, the truck type is not necessarily limited to a wing body truck.

Hereinafter, unless mentioned otherwise, pallets placed on a truck are assumed to be loaded with cargo.

FIG. 1 illustrates a block diagram of a truck unloading apparatus, in accordance with one or more embodiments.

In an example, a truck unloading apparatus 100 generates sensing information regarding the presence or absence of a pallet by using sensors installed in an upper part of a truck and an upper part of a storage area, and sets optimal transport paths for multiple unmanned forklift vehicles by using this sensing information. The truck unloading apparatus 100 includes a truck 110, an unmanned forklift vehicle 120, and a pallet storage area 130 (or "storehouse"). Moreover, as an auxiliary device that senses the presence or absence of a pallet, the truck 110 includes a first sensor 112 in an upper part of the truck, and the storage area 130 includes a second sensor 132 in an upper part thereof.

Here, the components included in the truck unloading apparatus 100 according to this embodiment are not necessarily limited to the above. For example, the truck unloading apparatus 100 may additionally have a controller (not shown) that collects sensing information regarding the presence or absence of a pallet and sets optimal transport paths for multiple unmanned forklift vehicles 120 by using this sensing information. Also, the controller may control the multiple unmanned forklift vehicles 120 so as to move a pallet using the set transport path.

Meanwhile, in the example in FIG. 1, the first sensor 112 is illustrated as being installed on an inner side of a lid of a wing body truck (e.g., an inner side of a lid that constitutes a sidewall of a loading compartment while the lid is closed) and positioned in an upper part of the truck while the lid is open, but not necessarily limited to this. For example, the first sensor 112 may be mounted on a rack installed inside the loading compartment—that is, the first sensor 112 may be considered to be positioned in an upper part of the truck.

A device (not shown) to be equipped with the controller of the truck unloading apparatus 100 according to this embodiment may be a programmable computer installed in the multiple unmanned forklift vehicles 120 or in a server (not shown). A controller of the server may collect sensing information regarding the presence or absence of a pallet, and set an optimal transport path for the multiple unmanned forklift vehicles 120 by using this sensing information. Also, a controller of the unmanned forklift vehicle 120 may control the unmanned forklift vehicle 120 to move a pallet using the set transport path.

Meanwhile, the unmanned forklift vehicle 120 includes at least one radio communication interface that can connect to the server. Using this radio communication interface, the server may control the overall operation of the unmanned forklift vehicle 120 unloading cargo from the truck 110. For example, the controller of the server may transmit a transport command including the optimal transport path to the unmanned forklift vehicle 120 using the radio communication interface. In the following description of this disclosure, the controller refers to the controller on the server unless mentioned otherwise.

The illustration in FIG. 1 is an example construction according to one or more embodiments, and various implementations are possible, including other components or other connections between components, depending on the shapes of the first sensor and the second sensor and the method of implementing the controller.

Figure 2:
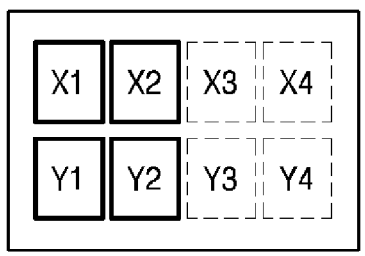
FIG. 2 illustrates an example view showing the presence or absence of a pallet in a truck and a storage area according, in accordance with one or more embodiments.
Figure 2:
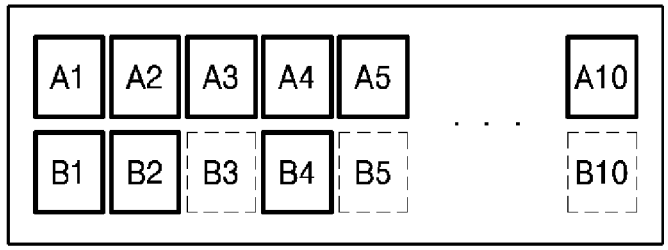

As illustrated in FIG. 1, the truck 110 includes a first sensor 112 in an upper part of the truck. As illustrated in FIG. 2, after the truck 110 stops to unload cargo, the first sensor 112 generates first information as sensing information regarding the presence or absence of a pallet in a storage position or area within the truck (hereinafter, "first storage position" or "first storage area"). In the example in FIG. 2, a solid line rectangle represents a position where a pallet is present, and a dotted line rectangle represents a position where no pallet is present.

The truck 110 according to one or more examples may include at least one radio communication interface that can connect to the server. Using this radio communication interface, the first information generated by the first sensor may be transmitted to the controller.

As illustrated in FIG. 1, the storage area 130 includes a second sensor 132 in an upper part of the storage area. As illustrated in FIG. 2, the second sensor generates second information as sensing information regarding the presence or absence of a pallet in a storage position or area (hereinafter, "second storage position" or "second storage area") within the storage area. In the example of FIG. 2, a solid line rectangle within the storage area represents a position where a pallet is stored, and a dotted line rectangle represents an unoccupied position.

The storage area 130 according to an example may include at least one radio communication interface that can connect to the server. Using this radio communication interface, the second information generated by the second sensor may be transmitted to the controller.

Meanwhile, the first sensor 112 and the second sensor 132 may be implemented as, but are not limited to, ultrasonic sensors like those used to sense the presence or absence of a vehicle in a parking management system. Any sensor that can be used to detect a target object may be used to implement the first sensor 112 and the second sensor 132.

As explained above, according to this embodiment, it is possible to sense the presence or absence of a pallet simply by a sensor without converting the storage area such as installing shelves or racks, by installing the second sensor in an upper part of the storage area 130.

The controller according to one or more embodiments receives first information from the first sensor 112, regarding the presence or absence of a pallet in a first storage position within the truck 110, and receives second information from the second sensor 132, regarding the presence or absence of a pallet in a second storage position within the storage area 130.

Meanwhile, in the case of a wing body truck, a larger number of pallets may be unloaded from the side, as compared to a regular truck. Thus, the time taken to unload all pallets placed on the truck may be further reduced by doing the unloading using multiple forklift vehicles.

Accordingly, for at least one unmanned forklift vehicle 120, the controller may set a first storage position identified as having a pallet as a start point based on the first information, set a second storage position identified as unoccupied based on the second information as an arrival point, and then set an optimal transport path between the start point and the arrival point by finding the shortest path. Also, the controller may identify the current position of an unmanned forklift vehicle and then set an optimal transport path between the current position and the start point.

The controller transmits a transport command including the optimal transport path to each of the at least one unmanned forklift vehicle 120.

Each unmanned forklift vehicle 120 transports a pallet using a set transport path. That is, the controller of each unmanned forklift vehicle 120 may control the unmanned forklift vehicle 120 so as to transport a pallet using a set transport path.

The controller may take into account the chance of collision with at least one unmanned forklift vehicle 120 when setting the optimal transport path.

Figure 3:
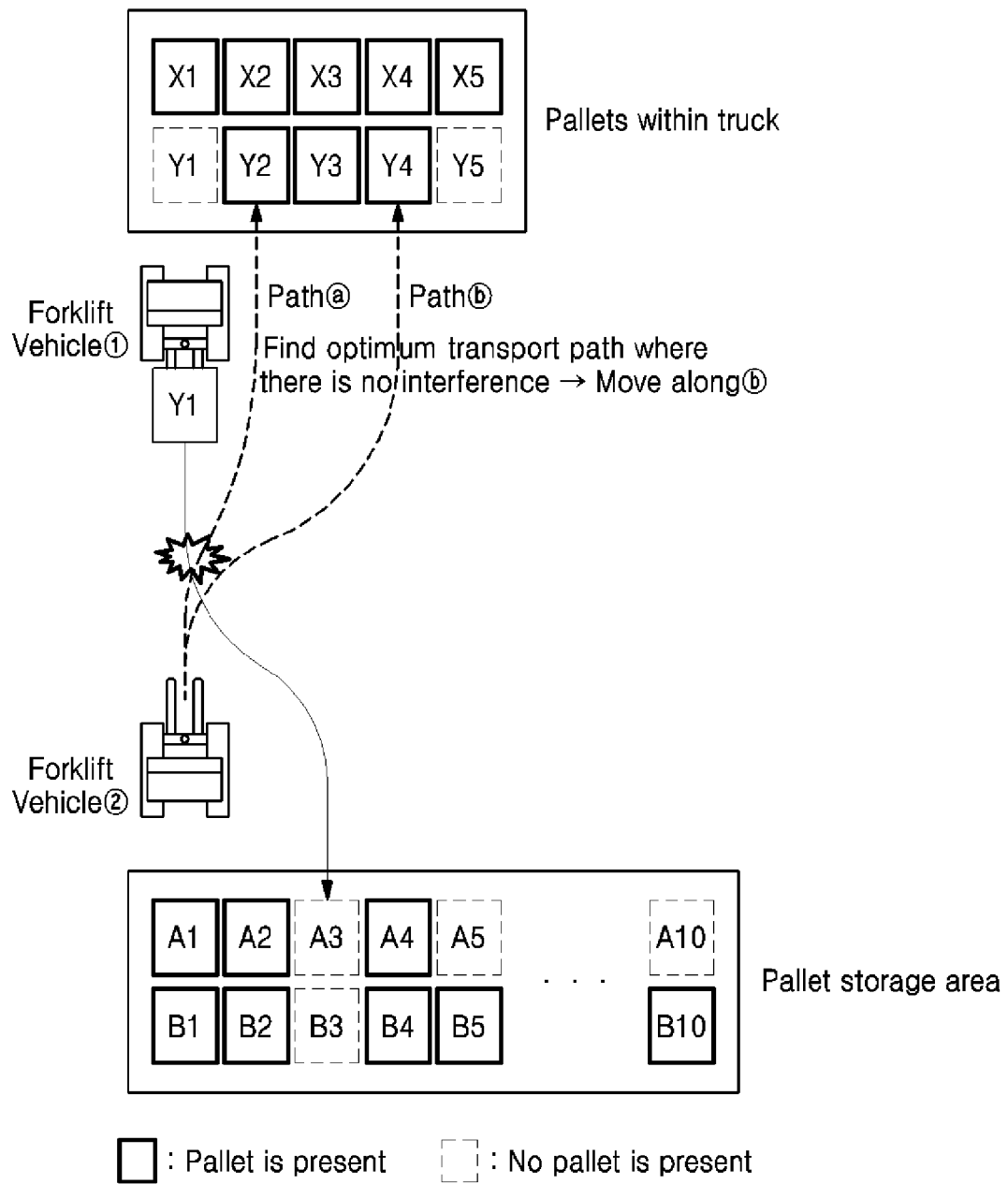
FIGS. 3 and 4 are illustrate example views of how an optimal transport path is set, in accordance with one or more embodiments.
Figure 4:
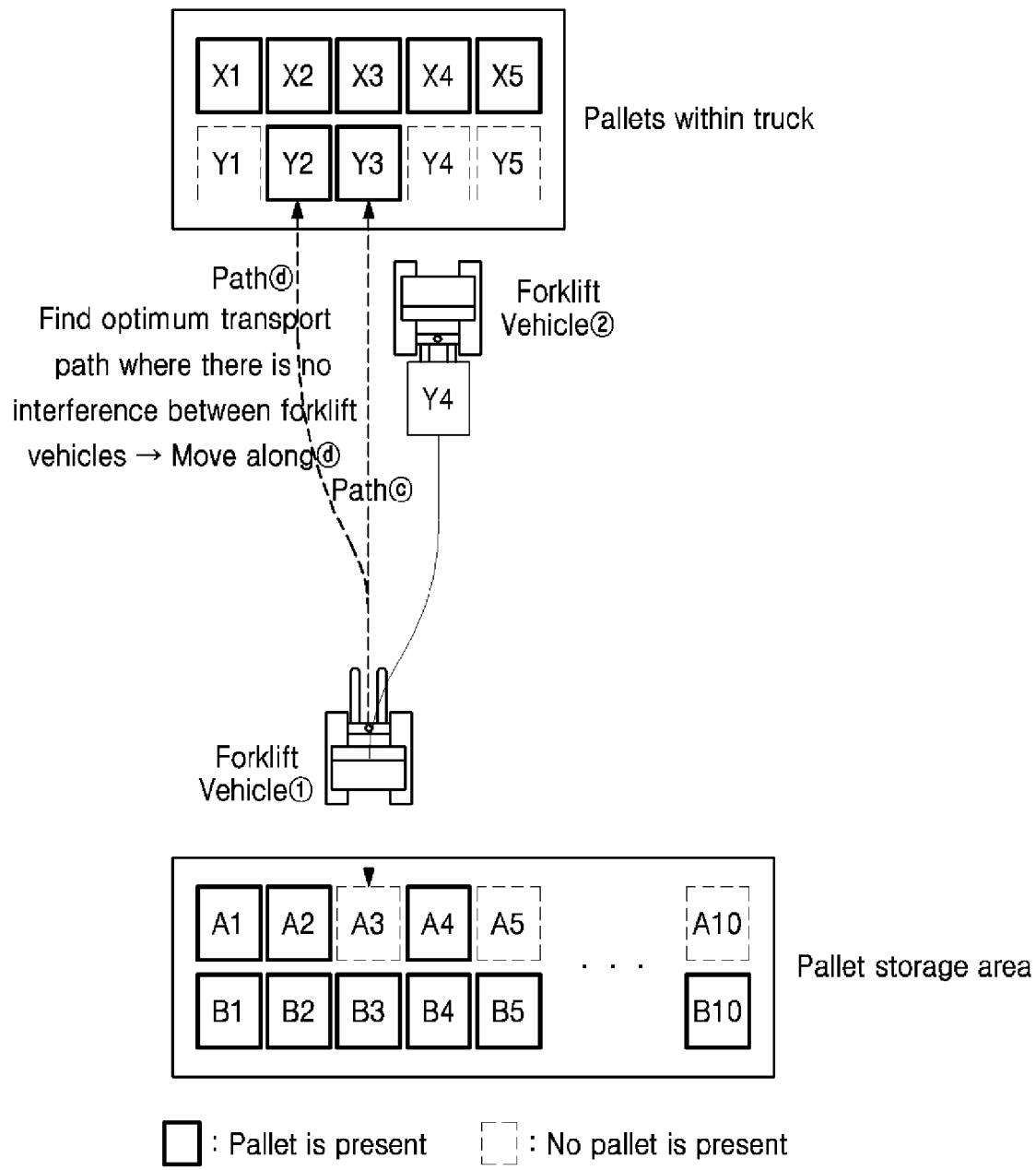

FIGS. 3 and 4 illustrate example views of how an optimal transport path is set, in accordance with one or more embodiments.

In the example in FIG. 3, Forklift Vehicle ① is supposed to unload a pallet from Position Y1 and move it to Storage Position B3, by using an assigned transport path. In this instance, in determining Forklift Vehicle ②'s access to a storage position within the truck where a pallet is present, the controller may set an optimal access path by finding at least one (e.g., every) access path available for Forklift Vehicle ②, taking into account the chance of collision with Forklift Vehicle ① along its predicted transport path.

For example, the controller may set access paths sequentially for pallets available for transportation, from the pallet in the position (e.g., Y2) closest to Forklift Vehicle ② (that is, the pallet located within the shortest distance from it) to the pallet in the position (e.g., X5) located farthest away from it, and calculate the chance of collision with Forklift Vehicle ① for each of the set paths. Here, the chance of collision may be calculated by determining whether or not the access path of Forklift Vehicle ② overlaps with a certain radius from each point on the predicted transport path of Forklift Vehicle ①.

If the chance of collision with Forklift Vehicle ① for the access path of Forklift vehicle ② is equal to or below a preset threshold, the controller may set this access path as the optimal access path. FIG. 3 illustrates an example in which, after calculating the chance of collision for Path ⓐ to Y2, Path ⓑ to Y4 is set as the optimal transport path with no interference between the forklift vehicles because the chance of collision with Forklift Vehicle ① for this path is equal to or below a preset threshold.

In the process of determining the optimal access path illustrated in FIG. 3, the controller may schedule unloading of a pallet in a first storage position within the truck 110.

In the example of FIG. 4, Forklift Vehicle ② is supposed to unload a pallet from Position Y4 and move it to Storage Position A3, by using a transport path assigned to it. In this instance, in determining Forklift Vehicle ①'s access to a storage position within the truck where a pallet is present, the controller may find at least one (e.g., every) access path available for Forklift Vehicle ①, taking into account the chance of collision with Forklift Vehicle ② along its predicted transport path.

For example, the controller may set access paths sequentially for pallets within the truck available for transportation, from the pallet in the position (e.g., Y3) closest to Forklift Vehicle ① (that is, the pallet located within the shortest distance from it) to the pallet in the position (e.g., X1 or X5) located farthest away from it, and calculate the chance of collision with Forklift Vehicle ② for each of the set paths.

If the chance of collision with Forklift Vehicle ② for the access path of Forklift vehicle ① is equal to or below a preset threshold, the controller may set this access path as the optimal access path. FIG. 4 illustrates an example in which, after calculating the chance of collision for Path ⓒ to Y3, Path ⓓ to Y2 is set as the optimal transport path with no interference between the forklift vehicles because the chance of collision with Forklift Vehicle ② for this path is equal to or below a preset threshold.

In setting the optimal access path as exemplified in FIG. 3 or FIG. 4, the controller may assume that Forklift vehicle ① and Forklift Vehicle ② move at a preset average speed.

The example in FIG. 3 or FIG. 4 describes a path along which a forklift vehicle accesses a storage position within a truck where a pallet is present. Meanwhile, the method of setting an optimal transport path exemplified in FIG. 3 or FIG. 4 may be applied also when determining a forklift vehicle's transport path to an unoccupied storage position within a pallet storage area.

As described above, an unmanned forklift vehicle's transport path may be set in advance by the controller. Also, upon sensing an obstacle such as a person or other unmanned forklift vehicle, the unmanned forklift vehicle may stop or travel away from it.

As explained above, according to this embodiment, it is possible to combine unmanned forklift vehicle control and material management for efficient operation by providing an automatic truck unloading apparatus and method that generate sensing information regarding the presence or absence of a pallet by using sensors installed in an upper part of a truck and an upper part of a storage area, and set optimal transport paths for multiple unmanned forklift vehicles by using this sensing information.

According to an example, it is possible to check the number of remaining pallets in a truck and therefore calculate a predicted operation time to facilitate operation management, by generating sensing information regarding the presence or absence of a pallet by using sensors installed in an upper part of a truck and an upper part of a storage area on a flat ground.

Figure 5:
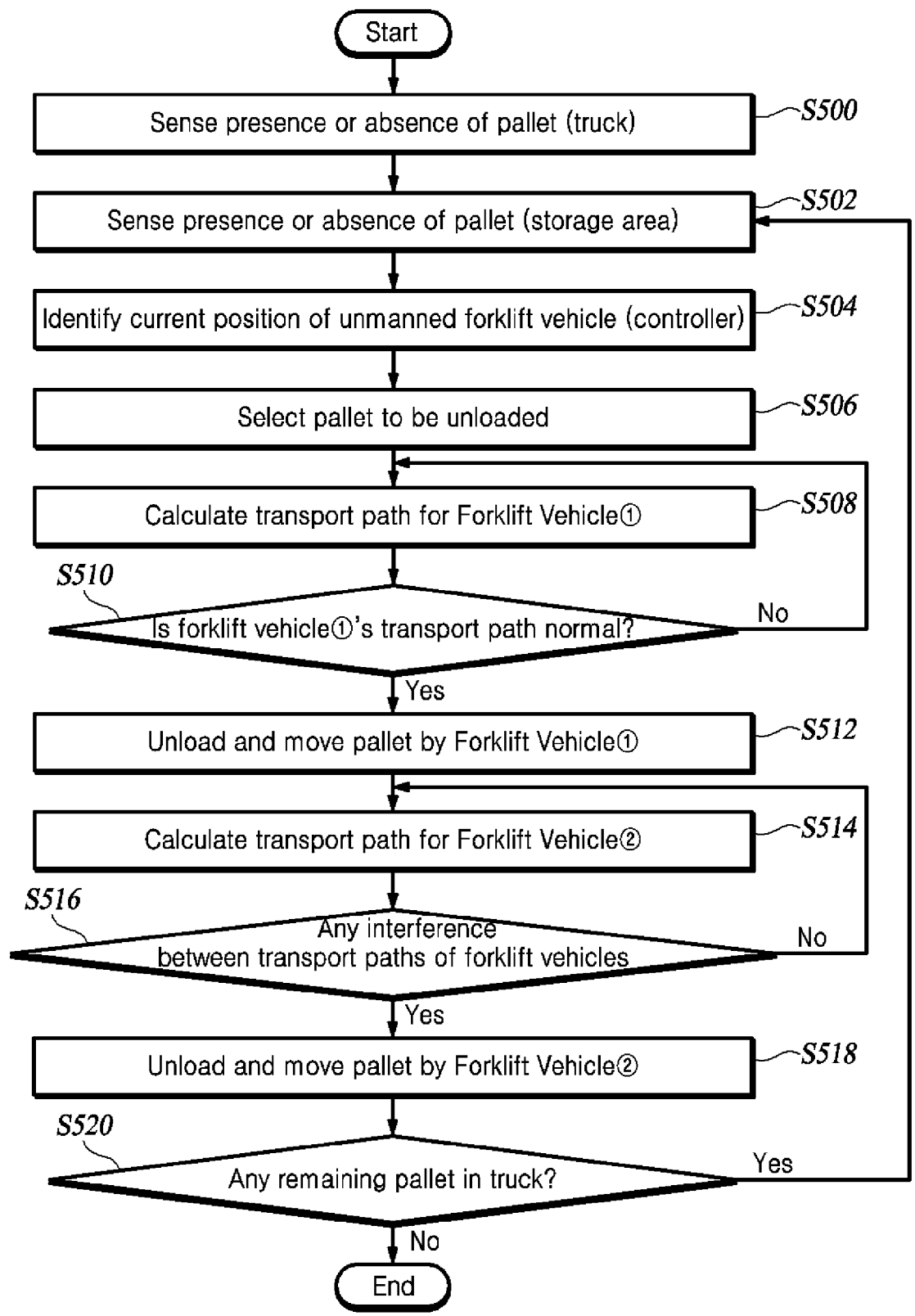
FIG. 5 is a flowchart of a method of unloading cargo from a truck, in accordance with one or more embodiments.

FIG. 5 is a flowchart of a method for unloading cargo from a truck, in accordance with one or more embodiments.

The example in FIG. 5 illustrates that truck unloading is performed using two unmanned forklift vehicles 120.

The truck unloading apparatus 100 senses the presence or absence of a pallet in a first storage position within a truck by using a first sensor (S500). Using a radio communication interface between a server and the truck 110, a controller of the truck unloading apparatus 100 may receive first information as sensing information detected by the first sensor.

The truck unloading apparatus 100 senses the presence or absence of a pallet in a second storage position within a storage area by using a second sensor (S502). Using a radio communication interface between the server and the storage area 130, the controller may receive second information as sensing information detected by the second sensor.

The truck unloading apparatus 100 identifies the current position of an unmanned forklift vehicle it is going to use (S504). Using a radio communication interface between the server and the unmanned forklift vehicle 120, the controller may identify the current position of the unmanned forklift vehicle 120.

The truck unloading apparatus 100 selects a pallet to be unloaded based on the first information and the second information (S506). Here, the selecting of a pallet to be unloaded by the controller also involves selecting a storage position to which the pallet is to be moved.

The truck unloading apparatus 100 calculates a transport path for Forklift Vehicle ① (S508).

The truck unloading apparatus 100 checks whether the forklift vehicle's transport path is normal (S510).

The controller determines the shortest transport path for Forklift Vehicle ① and then calculates every transport path predicted for Forklift Vehicle ②. When selecting the shortest path for Forklift Vehicle ①, the controller checks the chance of collision between Forklift Vehicle ① and Forklift Vehicle ②.

Here, the "chance of collision" may be calculated by determining whether or not the access path of Forklift Vehicle ① overlaps with a certain radius from each point on the predicted transport path of Forklift Vehicle ②. If the chance of collision with Forklift Vehicle for the transport path of Forklift Vehicle ① is equal to or below a preset threshold, the controller may set this transport path as the optimal transport path.

If the chance of collision exceeds the threshold and therefore the transport path is not deemed normal because it is expected that a collision will occur, the controller sets the next shortest transport path for Forklift Vehicle ① (S508) and re-checks whether the transport path is normal (S510). When setting the next shortest transport path for Forklift Vehicle ①, the controller may reselect a pallet to be unloaded and a storage position to which the pallet is to be moved (S506).

If the transport path is deemed normal, the truck unloading apparatus 100 controls Forklift Vehicle ① to unload and move the pallet using the set optimal path (S512). Using the radio communication interface between the server and the unmanned forklift vehicle 120, the controller may transmit a transport command including the optimal transport path to Forklift Vehicle ①.

The truck unloading apparatus 100 calculates a transport path for Forklift Vehicle ② (S514).

The truck unloading apparatus 100 checks whether there is any interference between the transport paths of the forklift vehicles (S516).

The controller determines the shortest transport path for Forklift Vehicle ② and then calculates every transport path predicted for Forklift Vehicle ①. When selecting the shortest path for Forklift Vehicle ②, the controller may check for any interference by calculating the chance of collision between Forklift Vehicle ① and Forklift Vehicle ②. If the chance of collision exceeds a preset threshold and therefore it is expected that a collision will occur, the controller sets the next shortest transport path for Forklift Vehicle ② (S514) and re-checks for any interference between the transport paths of the forklift vehicles (S516). When setting the next shortest transport path for Forklift Vehicle ②, the controller may reselect a pallet to be unloaded and a storage position to which the pallet is to be moved.

If there is no interference, the truck unloading apparatus 100 controls Forklift Vehicle ② to unload and move the pallet using the set optimal path (S518).

Using the radio communication interface between the server and the unmanned forklift vehicle 120, the controller may transmit a transport command including the optimal transport path to Forklift Vehicle ②.

The truck unloading apparatus 100 checks for any remaining pallet in the truck to be unloaded (S520). If there is any remaining pallet, the truck unloading apparatus 100 repeats the steps from the step 502 of sensing the presence or absence of a pallet. If there is no remaining pallet, the truck unloading operation is finished.

The apparatuses, units, modules, devices, and other components, described herein may be implemented by hardware components and software components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

REFERENCE NUMERALS

100: Truck unloading apparatus
110: Truck
112: First sensor
120: Unmanned forklift vehicle
130: Storage area
132: Second sensor

What is claimed is:

1. A truck unloading apparatus, comprising:
a first sensor configured to generate first information as first sensing information regarding a presence or an absence of a first pallet in each of a plurality of first storage positions within a truck, the first sensor being disposed in each of the plurality of the first storage positions;
a second sensor configured to generate second information as second sensing information regarding a presence or an absence of a second pallet in each of a plurality of second storage positions within a pallet storage area, the second sensor being disposed in each of the plurality of the second storage positions; and
a controller configured to receive the first information from the first sensor and receive the second information from the second sensor and set an optimal transport path for each of at least one unmanned forklift vehicle to move the first pallet from the truck to the pallet storage area based on the received first information and the received second information,
wherein the controller is further configured to set a first shortest path between a current position of one of the at least one unmanned forklift vehicle and a first selected start point by:
finding the first shortest path for the at least one unmanned forklift vehicle;
calculating a chance of collision between the at least one unmanned forklift vehicle along the first shortest path between the current position of the one of the at least one umanned forklift vehicle and the first selected start point and another unmanned forklift vehicle along a predicted transport path; and
setting the first shortest path between the current position of the one of the at least one unmanned forklift vehicle and the first selected start point as the optimal transport path when the chance of collision is equal to or less than a preset threshold;
wherein the at least one unmanned forklift vehicle and another unmanned forklift vehicle move at a preset average speed,
wherein the chance of collision is calculated by using whether or not an access path of the at least one unmanned forklift vehicle overlaps with a certain radius from each point on the predicted transport path of another unmanned forklift vehicle based on the preset average speed,
wherein the controller is further configured to reselect the first pallet to be unloaded from the truck and set a second shortest path between the current position of the one of the at least one unmanned forklift vehicle and a second selected start point as the optimal transport path when the chance of collision exceeds the preset threshold.

2. The apparatus of claim 1, wherein the controller is further configured to transmit a transport command comprising the optimal transport path to each of the at least one unmanned forklift vehicle.

3. The apparatus of claim 1, wherein the controller is further configured to:
set each of the plurality of first storage positions sensed as having the first pallet based on the first information as start points, and select one of the start points as a starting position for transport of the first pallet by determining a shortest path between a current position of the one of the at least one unmanned forklift vehicles and the selected start point, and
set each of the plurality of second storage positions sensed as being unoccupied based on the second information as arrival points, and select an arrival position for the transport of the first pallet by determining a shortest path between the starting position for transport of the first pallet and the arrival position.

4. The apparatus of claim 1, wherein the truck is a wing body truck, and unloading of the first pallet is performed at a side of the truck.

5. The truck unloading apparatus of claim 1, wherein the first sensor is disposed in an upper part of the truck.

6. The truck unloading apparatus of claim 1, wherein the second sensor is disposed in an upper part of the pallet storage area.

7. A method comprising:
generating first information as first sensing information regarding a presence or an absence of a first pallet in each of a plurality of first storage positions within a truck by implementing a first sensor, the first sensor being disposed in each of the plurality of the first storage positions;
generating second information as second sensing information regarding a presence or an absence of a second pallet in each of a plurality of second storage positions within a pallet storage area by implementing a second sensor, the second sensor being disposed in each of the plurality of the second storage positions;
receiving the first information from the first sensor and receiving the second information from the second sensor; and
setting an optimal transport path for each of at least one unmanned forklift vehicle to move the first pallet from the truck to the pallet storage area based on the received first information and the received second information;
wherein setting the optimal transport path includes setting a first shortest path between a current position of one of the at least one unmanned forklift vehicle and a first selected start point by:
finding the first shortest path for the at least one unmanned forklift vehicle;
calculating a chance of collision between the at least one unmanned forklift vehicle along the first shortest path between the current position of the one of the at least one unmanned forklift vehicle and the first selected start point and another unmanned forklift vehicle along a predicted transport path; and
setting the first shortest path between the current position of the one of the at least one unmanned forklift vehicle and the first selected start point as the optimal transport path when the chance of collision is equal to or less than a preset threshold;
wherein the at least one unmanned forklift vehicle and another unmanned forklift vehicle move at a preset average speed,
wherein the chance of collision is calculated by using whether or not an access path of the at least one unmanned forklift vehicle overlaps with a certain radius from each point on the predicted transport path of another unmanned forklift vehicle based on the preset average speed;
reselect the first pallet to be unloaded from the truck and set a second shortest path between the current position of the one of the at least one unmanned forklift vehicle and a second selected start point as the optimal transport path when the chance of collision exceeds the preset threshold.

8. A non-transitory computer-readable storage medium storing instructions that, when executed by a processor, cause the processor to:
generate first information as first sensing information regarding a presence or an absence of a first pallet in each of a plurality of first storage positions within a truck by implementing a first sensor, the first sensor being disposed in each of the plurality of the first storage positions;
generate second information as second sensing information regarding a presence or an absence of a second pallet in each of a plurality of second storage positions within a pallet storage area by implementing a second sensor, the second sensor being disposed in each of the plurality of the second storage positions; receive the first information from the first sensor and receive the second information from the second sensor; and
set an optimal transport path for each of at least one unmanned forklift vehicle to move the first pallet from the truck to the pallet storage area based on the received first information and the received second information,
wherein setting the optimal transport path includes setting a first shortest path between a current position of one of the at least one unmanned forklift vehicle and a first selected start point by:
finding the first shortest path for the at least one unmanned forklift vehicle;
calculating a chance of collision between the at least one unmanned forklift vehicle along the first shortest path between the current position of the one of the at least one unmanned forklift vehicle and the first selected start point and another unmanned forklift vehicle along a predicted transport path; and
setting the first shortest path between the current position of the one of the at least one unmanned forklift vehicle and the first selected start point as the optimal transport path when the chance of collision is equal to or less than a preset threshold;
wherein the at least one unmanned forklift vehicle and another unmanned forklift vehicle move at a preset average speed,
wherein the chance of collision is calculated by using whether or not an access path of the at least one unmanned forklift vehicle overlaps with a certain radius from each point on the predicted transport path of another unmanned forklift vehicle based on the preset average speed;
reselect the first pallet to be unloaded from the truck and set a second shortest path between the current position of the one of the at least one unmanned forklift vehicle and a second selected start point as the optimal transport path when the chance of collision exceeds the preset threshold.

* * * * *